July 26, 1949.　　　　O. P. PIERSON　　　　2,477,006
APPARATUS FOR PEELING FRUITS AND VEGETABLES
Filed June 7, 1943
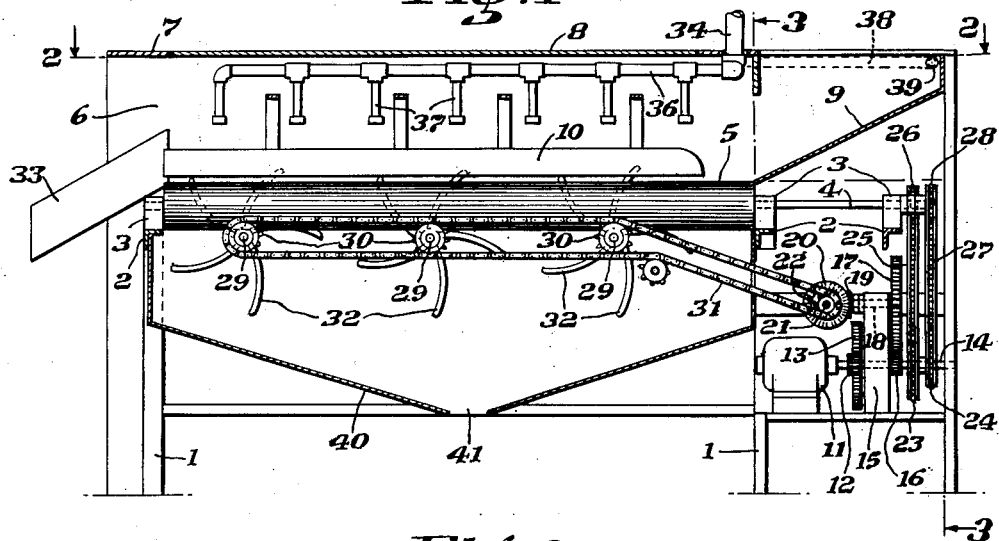
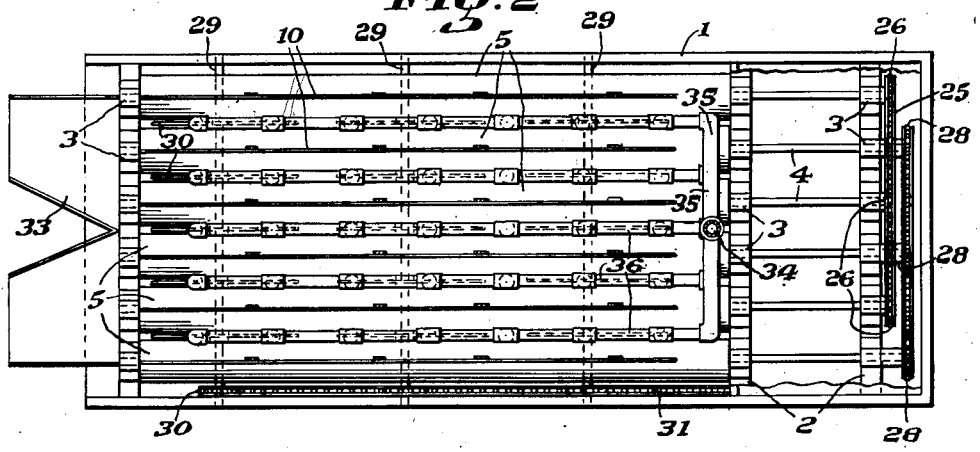
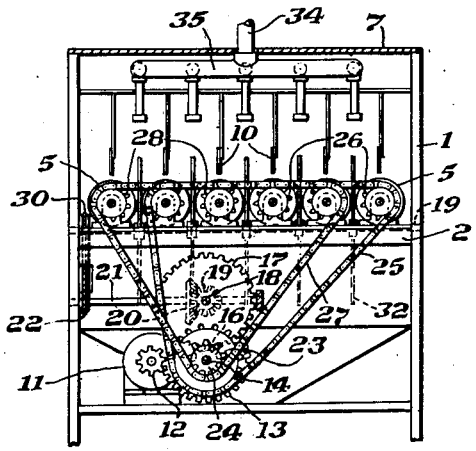
INVENTOR.
OLOF P. PIERSON
BY
Spear, Rawlings & Spear.
ATTORNEYS Patented July 26, 1949

2,477,006

UNITED STATES PATENT OFFICE 2,477,006

APPARATUS FOR PEELING FRUITS AND VEGETABLES

Olof P. Pierson, Caribou, Maine

Application June 7, 1943, Serial No. 489,912

1 Claim. (Cl. 146—50)

My invention relates to method and apparatus for washing or removing the skins from fruits and vegetables.

Various attempts have been made to provide apparatus in which fruits and vegetables may be washed or in which skins, loosened by previous treatment, may be removed. Where the fruits or vegetables are substantially regular in shape and uniform in size and only dirt is to be removed, the problem is not serious. Where, however, the skin itself of such fruits or vegetables is to be removed, and particularly where they are irregular in shape, many problems are present that make the desired operation difficult.

Apparatus in accordance with my invention consists essentially of at least one set of rolls disposed and spaced to support the fruits or vegetables. At least one of these rolls is rotated thereby to rotate the fruits or vegetables and preferably they are both rotated positively in the same direction, but may be rotated at different speeds or rotated in different directions. Their surfaces are preferably provided with a coat to ensure sufficient frictional engagement with the surfaces of the objects so that the relatively rapid rotation of the objects is ensured and means are provided to confine the rotating objects to maintain them in contact with the rolls. While gravity may be used to cause fruits and vegetables of regular shape to pass along the path, I provide means, independently of the rolls, to advance the objects along the path. Such advancing means may consist of at least one impeller having fingers extending between the rolls to engage with the objects and as by tumbling them urge them along their wanted path. These members, while urging the objects along their path, also serve to hold them back so that their movement is at a substantially constant rate regardless of their size and shape. As the rotating objects are advanced along their path, they are subjected to a liquid spray which contacts all surfaces of the objects to remove the dirt or skin therefrom quickly and thoroughly.

Apparatus in accordance with my invention is particularly well adapted for use in removing dirt or loosened skins from previously treated fruits and vegetables. Because of the great irregularity in size and shape of potatoes, the treatment of such may be considered to illustrate the novel features and advantages of my invention. Regardless of their irregularity, the loosened skin may be completely removed, even from the eyes, as they are constantly rotated as they are advanced so that they are thoroughly exposed to the skin removing spray. In such apparatus, abrading is minimized to avoid waste attendant the removal of untreated parts of the potatoes, although with some fruits and vegetables some degree of abrasive action is sometimes desired.

As the rate at which the impellers advance the fruits or vegetables through the apparatus can be varied, and, as the rate of rotation of the particular objects being treated may be varied, apparatus in accordance with my invention provides efficient and economical means adapted to meet satisfactorily a wide range of conditions imposed by the particular fruits or vegetables being treated and the particular treatment to which it is desired to subject them.

In the accompanying drawings, I have shown an embodiment of my invention particularly adapted for use in removing the skins from potatoes which have previously been subjected to a skin loosening treatment as such an embodiment will illustrate its many novel features and advantages.

In the drawings:

Fig. 1 is a partly sectioned side view of apparatus in accordance with my invention.

Fig. 2 is a longitudinal section along the lines 2—2 of Fig. 1, and

Fig. 3 is a vertical section along the lines 3—3 of Fig. 1.

Apparatus in accordance with my invention comprises a frame 1 having cross members 2 on which are mounted a plurality of sets of alined bearings 3 for the shafts 4.

The shafts 4 extend from end to end of the apparatus and support rolls 5 which may be rubber covered or covered with abrasive or the like to ensure that the objects are frictionally engaged and to provide an abrading action if such is wanted. The shafts 4 are arranged in parallel, where only dirt or loosened skins are to be removed, and are spaced sufficiently closely to each other to support the objects to be treated.

The frame 1 is provided with walls 6 and a cover 7 which includes a hinged section 8 to permit ready access to the interior of the apparatus. At 9, I have shown an inclined floor establishing a hopper feed to the several paths for the objects. Partitions 10 which extend longitudinally of the apparatus are supported to depend over the center of each of the rolls to maintain the rotating objects in contact with them so that the wanted paths for the objects are defined by adjacent portions of adjacent rolls. The partitions 10 thus effect an arrangement of the rolls in sets, here shown as each including a pair of rolls.

Under the floor 9 I house the roll driving means by which the objects are rotated. While one or more of the rolls of each set may be rotated and where more than one roll is rotated, the rolls may be rotated in the same or different directions and at different speeds, the roll rotating means shown in the drawings having proved efficient. These means may conveniently consist of a motor 11 having a drive gear 12 in mesh with a gear 13 on a stub shaft 14 journalled in a stand 15. The shaft 14 carries a gear 16 meshing with a gear 17 on the shaft 18 having a beveled gear 19 in mesh with the beveled gear 20 on the shaft 21 supported transversely of the apparatus. The shaft 21 carries a sprocket 22.

The shaft 14 has a pair of sprockets 23 and 24 with a chain 25 connecting the sprocket 23 with the sprockets 26 with which one of the shafts 4 defining each path is provided. The sprocket 24 is connected by a chain 27 to sprockets 28 with which the other of the shafts 4 defining each path is provided.

By this construction, each of the rolls 5 defining each path is positively driven at the desired rates and the rate of rotation of each or the relative rate of rotation of each pair may be varied as desired by substituting for both or either of the sprockets 23, 24, sprockets of different size. By such means, the objects supported by the pairs of rollers 5 are rotated relatively rapidly.

While the rolls may be disposed at an incline to provide a gravity flow of the objects through the apparatus, in order that objects may be advanced through the apparatus at a controlled rate, particularly where they are irregular and when more than washing is required, as is the case with potatoes, the skins of which have been loosened by previous treatment, I provide object advancing means. Such means may conveniently be of the type shown in the drawings.

Shafts 29 are rotatably supported under the rolls 5 transversely of the apparatus. The shafts 29 each carry a sprocket 30 driven from the sprocket 22 by a chain 31. Between adjacent rollers 5, each of the shafts 29 carries an impeller consisting of a hub having a plurality of relatively narrow long fingers 32 adapted to pass through the narrow space between the rollers 5 to advance the objects along the paths at a substantially constant rate. For example, if the objects are potatoes, relatively round potatoes discharged into the hopper would tend to roll or would tend to roll if carried on a conveyor, while irregular potatoes would be relatively unaffected thereby. For that reason, I provide advancing means that, while positively advancing the objects as by tumbling them, control positively their rate of advancement through the apparatus onto the discharge chutes 33.

Preferably, the fingers 32 are rigid in order to ensure that, in operation, they do not come into engagement with the rollers 5. The fingers 32 are angularly spaced to define a pocket of sufficient size to accommodate several potatoes and are relatively long to effect the controlled advancement of the potatoes for a substantial distance. The fingers 32 are preferably curved oppositely to the direction of their travel to avoid the possibility of crushing the potatoes against the rollers 5. I have shown the impellers as spaced from each other so that the zones of the fingers 32 do not overlap.

In accordance with my invention, the objects are rotated and advanced through a series of sprays by which loosened peelings are removed. At 34, I have indicated a feed from a suitable water source connected to a header 35 having a plurality of conduits 36 disposed above the paths for the objects. The conduits 36 each have a plurality of spray outlets 37 and at 38 I have indicated a conduit having a plurality of spray outlets 39 to flush the floor 9 of the hopper feed. I have shown a collecting tank at 40 disposed to receive the wash water, and skins, and other waste which may be piped off from the outlet port 41 to be disposed of in any desired way.

By this construction, I am able to provide simple and efficient apparatus for washing or removing the skins of such objects as fruits and vegetables. As the rate of rotation of the objects may be varied as desired and as the rate of rotation of the impellers may also be varied, apparatus in accordance with my invention is adapted for use with a wide range of objects and to provide a wide range of treatment. The action of the rolls may be further varied by the type of coat or covering with which they are provided and by changing their relative speeds or direction of rotation. In this way, any desired degree of abrasive action may be obtained to impart a tangential force to the skins of the objects. With sufficient force exerted tangentially of the objects treated, the skins are caused to slide along the underlying substance, breaking the bond completely between the skins and the underlying substance. When so broken the skins are readily freed and disengaged by the spray from the objects treated and washed clear.

The function of the sprays 37 is of real importance where loosened skins are to be removed, particularly where no abrading action is provided. The spray must be of sufficient force and of sufficient volume and intensity to remove the skin by erosion and, at the same time, the jets must not be so localized in their contact with the objects as to pit or groove them. I have found that the water pressure may range substantially from 40 to 80 pounds per square inch. The spray action may be further characterized as providing contact over a sufficiently wide area of each object to ensure uniform treatment. The distance of the sprays from the objects, the time of exposure of the objects to the spray, and the rate of rotation of the objects are other important factors. In accordance with my invention, I utilize a spray of sufficient pressure to remove the skin and rotate the object sufficiently rapidly to prevent injury of the object by the spray and to ensure maximum surface exposure of the object to the spray.

In accordance with my invention, the objects are positively rotated and advanced through the spray chamber with their advancement being preferably characterized by a tumbling action. The rate of rotation of the objects is relatively rapid as compared with their rate of advancement. For example, I have found that satisfactory results are obtained by driving one of the rolls defining each path at 200 R. P. M. and the other path defining roll at 100 R. P. M. and driving the impellers at 2 R. P. M. The combined high peripheral motion of the rolls and the relatively lower advancing rate of speed of the impellers ensures the exposure of all parts of each object to the spray. The spray and the tangential action of the rolls itself, as I have stated, is distributed over a substantial area of each object and this, combined with the rate of rotation of the objects, results in the skins being thoroughly removed without affecting the untreated part of each object.

Because my invention combines efficiency and economy in operation with a high volume of production, I am able to provide apparatus adapted for a wide range of treatment of many different fruits and vegetables.

What I therefore claim and desire to secure by Letters Patent is:

In apparatus for peeling such objects as fruits and vegetables, the combination comprising cylindrical rolls positioned with their axes parallel to each other and close enough together to form the sole support for the said objects, means for rotating adjacent rolls at different speeds with the peripheral surface of at least one such roll moving downwardly at the bite between such rolls to thus impart to the objects a rotational motion in a direction transverse to the axes of the rolls, means for impelling the objects in a rolling motion in a direction lengthwise of the rolls, said impelling means consisting of a plurality of rotatable members with their axes positioned below said rolls and at right angles to the axes of the rolls, each rotatable member having long narrow arms curved oppositely to the direction of rotation of the members and extending between adjacent rolls to intermittently push the objects lengthwise of the rolls, and means for delivering a liquid spray downwardly against the objects supported on the rolls.

OLOF P. PIERSON.

REFERENCES CITED

The following references are of record in the file of this patent:

UNITED STATES PATENTS

| Number | Name | Date |
| --- | --- | --- |
| 414,738 | White | Nov. 12, 1889 |
| 616,284 | Baker et al. | Dec. 20, 1898 |
| 803,850 | Prince | Nov. 7, 1905 |
| 842,378 | Baker | Jan. 29, 1907 |
| 1,012,046 | Anderson | Dec. 19, 1911 |
| 1,647,815 | Riddell | Nov. 1, 1927 |
| 1,810,511 | Wolfinger | June 16, 1931 |
| 1,899,292 | Rienks | Feb. 28, 1933 |
| 1,923,743 | Perkins | Aug. 22, 1933 |
| 1,927,405 | Johnson | Sept. 19, 1933 |
| 2,012,655 | Bowman | Aug. 27, 1935 |
| 2,199,459 | Herold et al. | May 7, 1940 |
| 2,364,946 | Burwick | Dec. 12, 1944 |